Patented Nov. 18, 1947

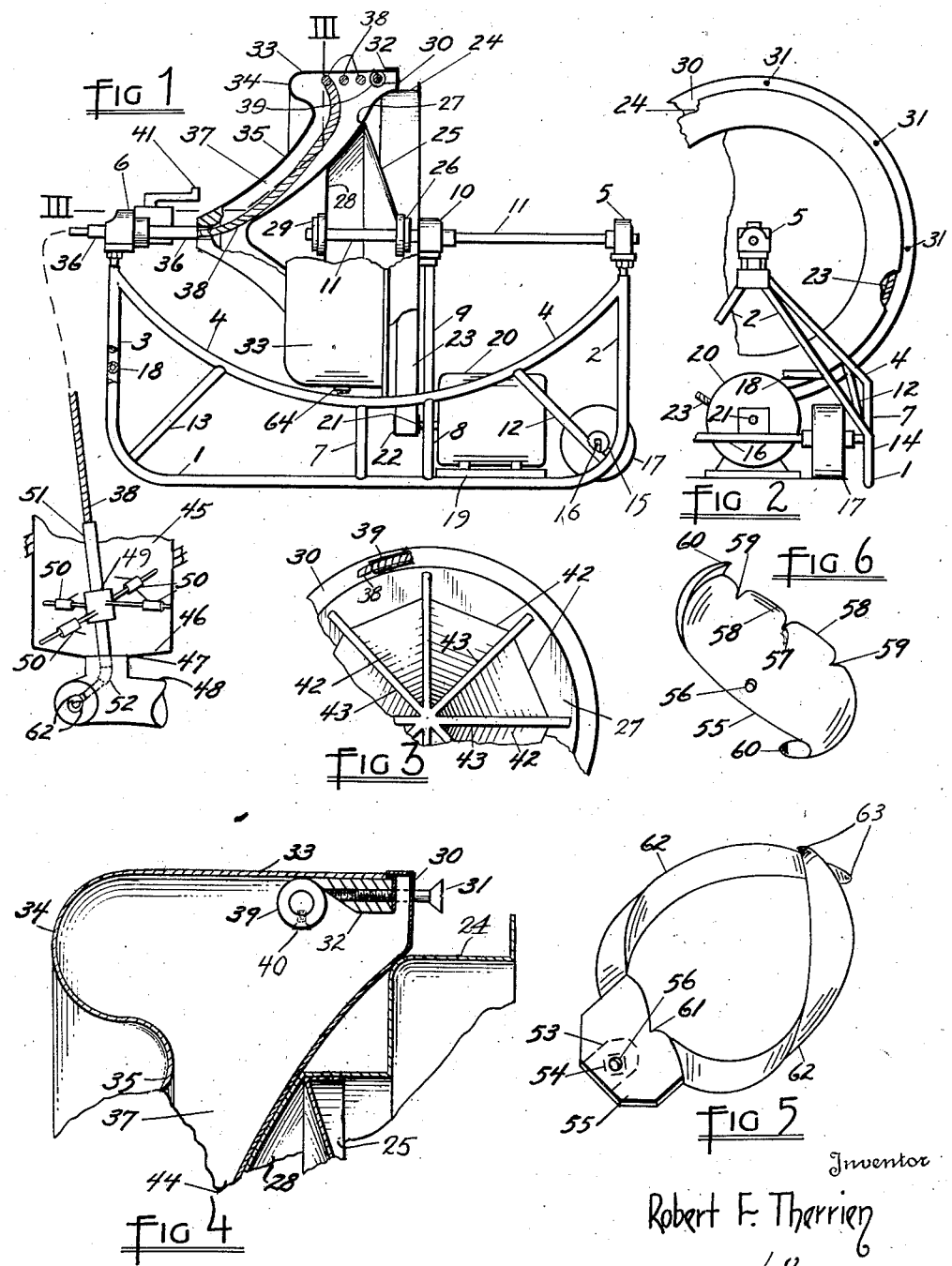

2,431,089

UNITED STATES PATENT OFFICE 2,431,089

DUCT INTERIOR CLEANING MEANS

Robert F. Therrien, Toledo, Ohio

Application December 27, 1943, Serial No. 515,777

1 Claim. (Cl. 15—104.30)

This invention relates to clearing equipment for pipes, ways, ducts, tunnels, passages, sewers and the like.

This invention has utility as a sturdy, compact, portable unit, effective in a wide range to overcome clogging, thru the power driven flexible drive shaft from a rotatable drum providing flexible shaft take-up and reserve for the desired longitudinal direction for shaft travel and control as to and with its tool terminus, herein shown as a cutting head.

Referring to the drawings:

Fig. 1 is a side elevation, with parts broken away, showing an embodiment of the invention in operative position clearing debris from a clogged sewer;

Fig. 2 is a partial end elevation, from the right of Fig. 1, showing features of the mounting truck and the drive for the drum;

Fig. 3 is a view from the line III—III, Fig. 1, looking in the direction of the arrow, showing the octagonal form of the inner polygonal cone or grip member for the snake or flexible shaft;

Fig. 4 is a section of a portion of the outer drum member with a spun or smooth inner cone member (instead of with corners or polygonal), which inner member is approaching assembly position with the outer member of the drum;

Fig. 5 is a perspective view of an arch connected, or closed figure two-prong cutting or digging knife; and Fig. 6 is a short connected two-armed tool or knife adapted for handling more resistant objects.

For ready portability, there is provided a two-wheeled cart or truck, herein shown as weld-assembled tubing or pipe comprising a pair of bottom rails 1 in parallel, with upwardly converging ends 2, 3, rigidity being given by a bow portion 4 therebetween extending upwardly from the respective bottom rails or normal support portions 1. The converging portions 2 mount a bearing 5, while in alignment therewith the converging portions 3 mount a bearing 6. Between the respective rails 1 and the bow 4 adjacent thereto, a reinforcing connector 7 is braced therewith centrally. Adjacent thereto supplemental reinforcement connector 8 continues upward and converging portions 9 thereof mount intermediate bearing 10, thereby to locate a shaft 11 in alignment with the bearing 6. The bow portions 4 have diagonal braces 12 extending to the junction of the rails 1 with the converging riser portions 2; and diagonal braces 13 extending to the junction of the rails 1 with the converging riser portions 3. The converging portions 2 have straight lower parallel portions 14 adjacent the rails 1. The portions 12 have bearings 15 for horizontal shaft 16 mounting a pair of rollers 17, for the respective ones of which rollers the straight portions 14 provide clearance. Below the bearings 5, 6, the converging ends 2, 3 have horizontally extending cross braces 18. At the converging ends 3, the horizontally extending cross brace 18 may serve as a directing handle, as such end be lifted to have the rails 1 adjacent thereto clear the ground or floor, and the wheels or rollers 17 thereby brought down to provide rolling support for the opposite end of this truck device. A plate 19 upon the rails 1 adjacent the braces or connectors 8 provides a platform on which is mounted a motor 20.

The motor 20 has a shaft 21 upon which is fixed a pulley 22 from which extends belt 23 to large pulley or drum flange 24. This pulley portion 24 of the drum has extending therefrom a disk section 25 to a bearing 26 on the shaft 11.

The disk section 25 is not directly connected to the pulley portion 24, but is directly connected to disk section 28 which in turn is in engagement with the concave portion of an inner cone member 27, the latter constituting an outer shell for the second disk section 28. The disk section 28 is provided with a bearing 29. Bearings 26 and 29 provide an outboard pair of supports on the shaft 11 for the drum, and to extend into the cone 27 to provide a substantial support radially inward from load strains on the drum in its normal operation.

The outer radial portion 30 of the member 27 is not only one side for the pulley portion 24, but thru screws 31 engages lugs 32 fixed on the cylindrical portion 33 of the drum outer shell. From portion 33 a semicircular inward roll portion 34 extends to inwardly tapering outer cone 35 having a tubular section 36 fixed therewith providing a flexible shaft guide, section 36 being mounted in the bearing 6. There is thus provided in alignment three bearings 26, 29, 6, for the drum having a chamber 37 therein, into which a flexible shaft 38 may be fed in and out by way of the guide 36 coaxial with the drum. On the inner side of the portion 30, that is away from the pulley side and at the drum interior, a short duct or pipe section 39 has weld anchoring to shell 33. Flush set screws 40 may anchor the end of the shaft 38. Inasmuch as this anchor sleeve 39 is open at each end, the shaft 38 may be inserted either way, thereby permitting the shaft wraps or coil therefrom to be either clockwise or counterclockwise in its winding direction into the drum chamber 37. The procedure thus to anchor an end of the snake or flexible shaft 38 with the inside of the outer wall of the chamber 37, is with the drum portion 33 disconnected from the portion 27, 30. Accordingly, it is not in order to clamp these portions 27, 30, together by tightening the screws 31 thru the flange or radial portion 30 in drawing it to nest about the drum portion 33, as the screws 31 operate in the lugs 32. To disconnect the shaft 38 for removal or replacement, the screws 31 are turned to be clear of the lugs 32, and as so released, the section 33 may be moved clear of the portion 27, 30. The showing of the screw 31 (Fig. 4) is before tightening.

The preferred type of flexible shaft is of helical wraps and has a normal tendency, as free to swing outward or take a larger radius arc in tending toward a more straight direction. Advantage is taken of this characteristic for accumulating the wraps in the cylindrical portion 33 between the portions 32, 34. A control handle 41 is effective for cutting out or either direction of driving for the reversible electric motor 20. The handle 41 is located near the guide 36, so that the operator may by grasping or loosely directing contribute to smoothness in control and movement out or inward as to the guide for the shaft 38 as being turned on its axis.

The experience is that one or more wraps of the shaft 38 are normally on the inner cone 27. Effective longitudinal actuation of the shaft 38 may be brought in by the firmness of the holding of the shaft 38 on the cone to resist pull or push to disturb the full coil wraps in the region 33. This gripping or holding action, say as the operator may push the shaft 38, say for a foot forward, and the drum rotations may tend to promote recoil, the original thrust, having brought the wraps to engage the member 27, such gripping is cumulative, especially in the grouping into a polygonal cone of sides 42 bonded by welded metal straps 43 at the corner portions thereof. These modified corners 43 for the polygonal outer face of the inner cone, provide this additional push and pull holding, altho in a considerable range of practice a smooth conical member 44 may answer (Fig. 4).

The helpful experiences referred to hereunder extend to a wide range of duct and passage clog clearing operations. The tactics to be adopted depend largely upon the particular job undertaken. For instance, a manhole chamber 45 at its bottom or floor 46 has an opening 47 to a sewer 48. Where considerable resistance may be met, it is helpful to be positive in the power drive control for the flexible shaft 38. Accordingly, a guide 49 may be centralized above the sewer opening 47 and there firmly anchored by hydraulic jacks or other adjustable bracing means 50 in a grouping of two or more to respond fully to the occasion. To minimize occasion for the shaft 38 to whip or wobble, especially when a workman be in the vicinity of the opening 47 to check and report progress, a pipe section 51, say 2" if the shaft be about ¾", may be assembled in the guide 49 and have a 45° elbow 52 to loosely direct the flexible shaft working direction in the sewer 48.

The shaft 38 terminus has a pair of ears 53 thru which a bolt 54 may extend to clamp a flat section 55 at opening 56 therethru for the bolt 54. There is thus provided a rigid and positive mounting for a multi-blade cutting tool to bite into clogging material in the duct or passage being given attention.

Where the obstacle be tough and hard, a short rigid cutting tool of short or close blade connection may be preferred. From central forward notch 57, approximately radial knife or cutting edge blade portions 58 extend to additional notches 59 to V-shaped outer major dimension blades 60. As herein shown (Fig. 6), the forward effectiveness is designed for clockwise direction of rotation. However for retraction, inasmuch as the blades 60 are of cutting edge both forward and rearwardly, the rotation direction may even be counterclockwise and comminution of any impeding material be had, should such not have been flushed away prior to the cutting tool withdrawal.

With greater extent of cutting edges or blades, more rapid cutting rate is had, as projecting from a medial notch 61 (Fig. 5) a pair of semi-cylindrical prongs 62 have the axes of such respective cylindrical portions approximately at right angles. Free pointed ends or tips 63 for the prongs 62 overlap as much as 15° as shown, which insures that in the cutting operation there is not a core to be left, but that there is effective comminution thruout, and this in either clockwise or counterclockwise rotation, for the prong blades 62 have cutting edges along both edges of their entire extent. Inasmuch as the intersecting axes directions are about 45° from the line of the axis to be given the cutting tool by the flexible shaft, there is more effective cutting progress clockwise forward, in sort of digging in action. This bevel inclination is likewise effective advantageously in counterclockwise withdrawal, over attempt to withdraw in clockwise rotation. However, the double cutting edge knife portions for the terminal tool have operational advantage in responding to shift in either direction at any point in normal or abnormal operation. It is thus possible to work backward and forward at any desired location, and with debris comminuting effectiveness. In use whether there be a guide 51, 52, or a guide 49, or both, it is preferred to run the shaft 38 therethru before attaching the tool. Some operations may be undertaken without a guide. Removal of a screw plug 64 in the drum section 33 permits ready draining.

What is claimed and it is desired to secure by Letters Patent is:

A duct interior cleaner comprising a frame, a rotatable drum in the frame, said frame having a pair of bearings and an additional intermediate bearing about which latter bearing one of the drum ends is inwardly tapered to provide a snake-supporting outer face, and a flexible snake with at least a portion thereof having torque-transmitting inner support engagement upon the tapered face of the drum from whence the snake extends axially from the drum to be directed into a duct interior, said bearings serving to mount said rotatable drum.

ROBERT F. THERRIEN.

REFERENCES CITED

The following references are of record in the file of this patent:

UNITED STATES PATENTS

| Number | Name | Date |
| --- | --- | --- |
| 2,167,268 | Sanger | July 25, 1939 |
| 2,267,493 | Clotz | Dec. 23, 1941 |
| 2,255,800 | Miller | Sept. 16, 1941 |
| 2,272,387 | Therrien | Feb. 10, 1942 |
| 2,005,936 | Crane | June 25, 1935 |
| 2,069,871 | Blanc | Feb. 9, 1937 |
| 2,236,468 | Crane | Mar. 25, 1941 |
| 2,223,005 | Kerber | Nov. 26, 1940 |
| 2,320,309 | Smith | May 25, 1943 |
| 2,183,618 | Magruder | Dec. 19, 1939 |